United States Patent [19]

Kaufeldt

[11] Patent Number: 4,505,315
[45] Date of Patent: Mar. 19, 1985

[54] METHOD AND A DEVICE FOR AUTOMATICALLY MOUNTING SPOKES IN WHEELS

[75] Inventor: Roland Kaufeldt, Tyresö, Sweden

[73] Assignee: Monark-Crescent AB, Varberg, Sweden

[21] Appl. No.: 559,850

[22] Filed: Dec. 12, 1983

Related U.S. Application Data

[63] Continuation of Ser. No. 297,758, Aug. 31, 1981, abandoned.

[30] Foreign Application Priority Data

Sep. 4, 1980 [SE] Sweden ............................ 8006194

[51] Int. Cl.³ ............................................. B21K 1/34
[52] U.S. Cl. ................................. 157/1.5; 29/159.02
[58] Field of Search ........................... 29/159.02, 802; 157/1.5, 1.55

[56] References Cited

U.S. PATENT DOCUMENTS

| | | | |
|---|---|---|---|
| 3,758,931 | 9/1973 | Patterson | 29/159.02 |
| 3,908,729 | 9/1975 | Carminati | 157/1.5 |
| 4,062,095 | 12/1977 | Storz | 29/802 |
| 4,187,895 | 2/1980 | Saruwatari et al. | 157/1.55 |
| 4,427,047 | 1/1984 | Guillermeir | 157/1.5 |

*Primary Examiner*—James G. Smith
*Attorney, Agent, or Firm*—Laff, Whitesel, Conte & Saret

[57] ABSTRACT

A method and a device for automatically mounting spokes in wheels. In the method, the hub of a wheel and the rim of a wheel are interconnected by an inner layer of spokes being supplied in a first station, whereafter the procedure is repeated in a second station for mounting an outer layer of spokes. If desired, this can be done simultaneously with the mounting of an inner layer of spokes in a new wheel in the first station. The device for automatically mounting spokes in wheels comprises rim support means, hub securing means, means for feeding spokes into flange apertures in the hub, means for clamping the ends of the spokes for defining the positions thereof, and means for threading nipples onto the spokes.

7 Claims, 6 Drawing Figures

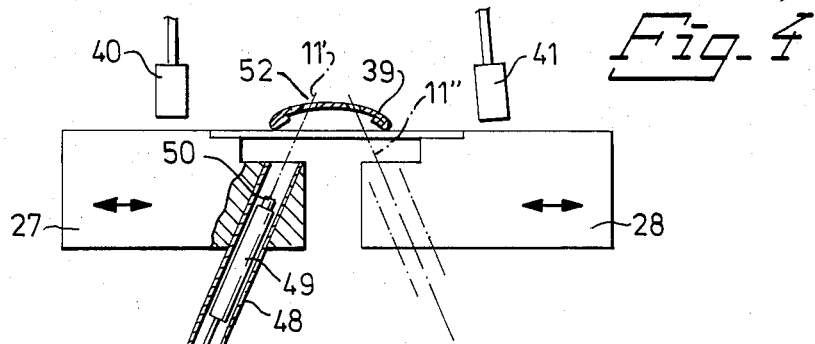
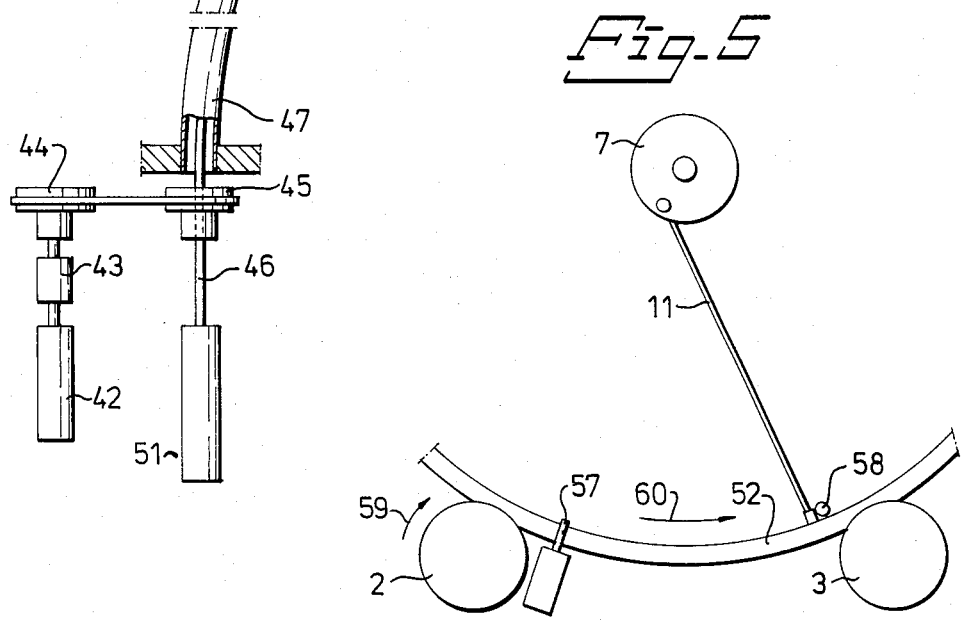
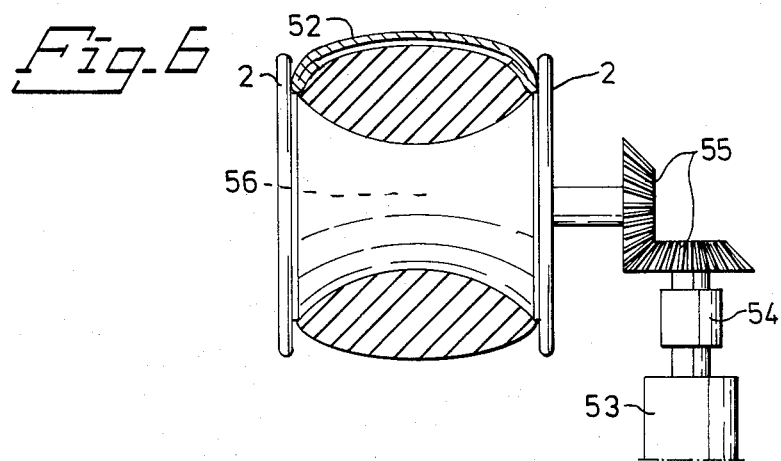

ND A DEVICE FOR
METHOD AND A DEVICE FOR AUTOMATICALLY MOUNTING SPOKES IN WHEELS

This is a continuation of U.S. patent application Ser. No. 297,758, filed Aug. 31, 1981, now abandoned.

BACKGROUND OF THE INVENTION

1. Field of the Invention

This invention refers to a method and a device for automatically mounting spokes in wheels, primarily bicycle wheels.

2. Description of the Prior Art

Mounting spokes in bicycle wheels manually is a very tedious operation, and furthermore it is extremely monotonous. This mounting is carried out by the person mounting the wheel introducing one spoke at a time through an individual spoke aperture in the wheel hub and thereafter fitting the spokes into apertures in the wheel rim and threading a nipple on each spoke from the outside of the rim.

SUMMARY OF THE INVENTION

The manual mode of operation described above results in that it is only possible for a person to mount comparatively few wheels in a working day. The invention has the object of eliminating this disadvantage by disclosing a method and a device for automatically mounting spoke wheels so as to enable the rate of productivity to be multiplied as compared to mounting manually. In the method, the hub of a wheel and the rim of a wheel are interconnected by an inner layer of spokes being supplied in a first station, whereafter the procedure is repeated in a second station for mounting an outer layer of spokes. If desired, this can be done simultaneously with the mounting of an inner layer of spokes in a new wheel in the first station. The device for automatically mounting spokes in wheels comprises rim support means, hub securing means, means for feeding spokes into flange apertures in the hub, means for clamping the ends of the spokes for defining the positions thereof, and means for threading nipples onto the spokes.

BRIEF DESCRIPTION OF THE DRAWINGS

The invention will be described more specifically in the following with reference to the accompanying drawings, in which FIG. 1 basically shows the general structure of a device in accordance with the invention, FIG. 4 shows means for threading nipples onto spokes, and FIGS. 5 and 6 show means for indexing a wheel rim and for locking the latter in correct position for mounting spokes.

DESCRIPTION OF THE PREFERRED EMBODIMENT

Figure 1:
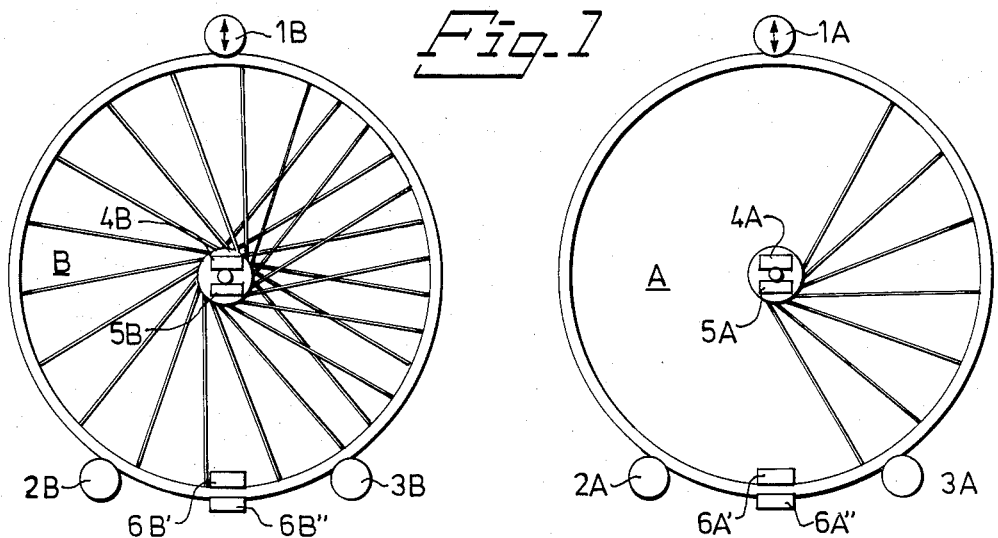

The device or machine disclosed by the invention operates in two individual cycles and basically comprises two identical halves or stations, viz. a right half or a first station as shown in the right hand portion of FIG. 1 and a left half or a second station as shown in the left hand portion of FIG. 1. Generally speaking, a wheel hub and a wheel rim are interconnected in the first station by means of for example 18 spokes disposed in predetermined positions and their associated 18 nipples, with said spokes together forming an inner or internal layer of spokes, i.e. the entire spoke except the spoke head is disposed on the inside of the hub flange. The wheel which thus is only partially completed by said inner layer of spokes is thereafter moved to the second station. In the second station an additional 18 spokes and 18 nipples are mounted, whereby an outer or external layer of spokes is formed. The inner and outer layers of spokes and the wheel rim and hub together form a complete spoke wheel of the type having 36 spokes.

The basic principle of the device of the invention is illustrated in FIG. 1, wherein it may be seen that each station A and B, respectively, in an illustrated embodiment of the device comprises three rim support rollers 1A, 2A, 3A and 1B, 2B, 3B, respectively, a hub clamp 4A and 4B, respectively, means 5A, 5B for feeding spokes into flange apertures in the hub, means 6A', 6B' for clamping the ends of the spokes for defining the positions thereof, and means 6A'', 6B'' for threading nipples onto the spokes. The clamps and means 4A, 4B, 5A, 5B, 6A', 6B', 6A'', 6B'' are diagrammatically illustrated in the form of blocks in FIG. 1 and they are shown more specifically in other figures.

As the two stations of the device are substantially identical the abbreviated designations 1–6 will be utilized from now on instead of the designations 1A–6A and 1B–6B, respectively, wherever this is possible without danger of misunderstanding.

The rim wheel is centered by means of the three support rollers 1, 2, 3, two of which may have stationary shafts whereas the third may be operated for example pneumatically or hydraulically. The hub clamp 4 may be comprised of two parts for each securing an individual end of the hub, with it being necessary to secure the hub arm in a predetermined position if the relevant hub is a rear wheel hub. The hub flanges are secured in their intended positions by means of two pins, each engaging a mating aperture in individual flanges, so that the spoke apertures of the hub flange always will be in one end the same position initially. The position of the rim is determined by a member 57 in cooperation with a member 58 which will be described more specifically below.

Figure 2:
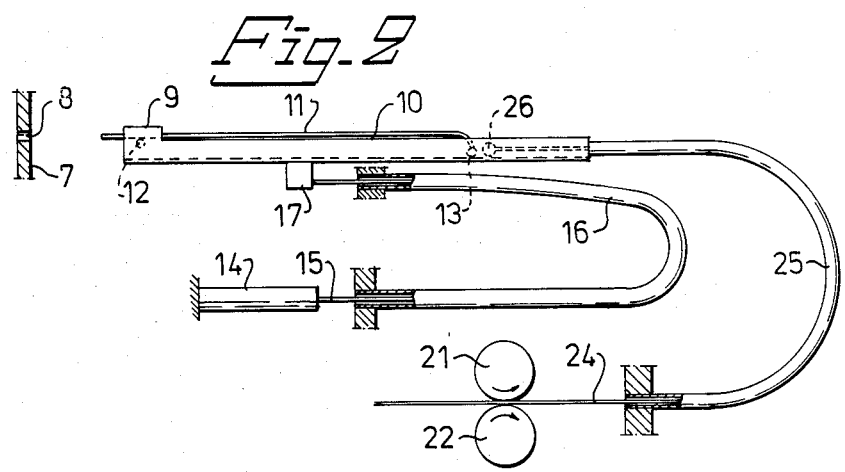
FIG. 2 shows means for feeding spokes into flange apertures.

The means 5 for feeding spokes into the flange apertures of the hub are shown more specifically in FIG. 2. In this Figure, the designation 7 relates to the flange of the wheel hub, said flange being provided with apertures 8. The designation 9 indicates an elongated tube having a longitudinal recess 10 whose side edges form a guide for a spoke 11 which is shown disposed in the tube 9 in such manner that the spoke 11 rests at two points 12 and 13, one of which, viz. 12, is located close to the left end of the spoke whereas the other one, 13, is formed by the downwardly directed spoke head at the right end of the spoke. The tube 9 is displaceable in its longitudinal direction by means of a feeder 14 of arbitrary appropriate type, for example a pneumatically or hydraulically operated piston, the feeder 14 actuating a flexible spiral spring 15 which by being guided in a tube 16 actuates tube 9 in consequence of a fastening member 17 being secured to the tube 9 at the end of spiral spring 15. Tube 9 may thus be displaced in the direction of flange 7 and in the direction away therefrom, respectively. In similar manner spoke 11 may be fed to aperture 8 in flange 7 and in through the aperture, viz. by means of two motor-driven rollers 21 and 22 which advance a flexible spiral wire 24 which extends through a tube 25 and which at its ends strikes the spoke head 13 with a shoulder 26 so as to displace spoke 11 through aperture 8. The spoke will now fall down on the left side of hub flange 7 and will hang vertically as the result of the influence of gravity, and it will be retained in hub flange 7 in consequence of spoke head 13 engaging said flange. The initial introduction of spoke 11 into tube 9 can be carried out in appropriate manner, for example by supplying it from a sorting device.

Figure 3:
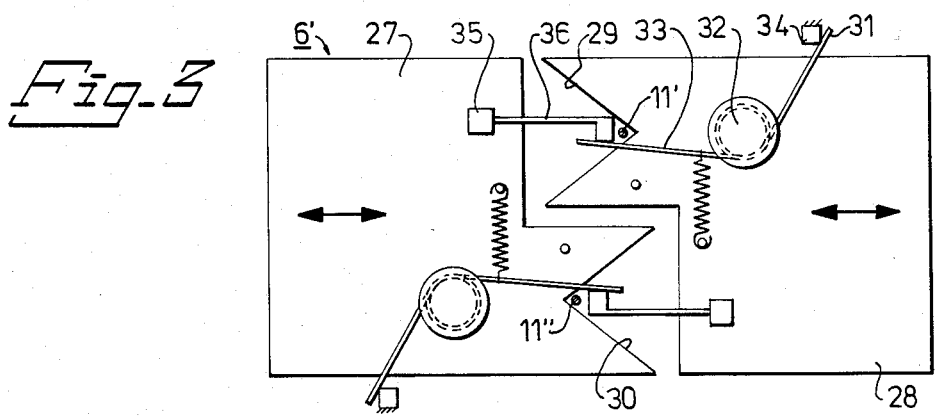
FIG. 3 shows means for clamping spoke ends in a predetermined position.

The means or device 6' for securing the end of the spoke for defining the position thereof after the spoke has been fed in through aperture 8 of FIG. 2 and hangs vertically is illustrated in FIG. 3. This device consists of two mutually similar and cooperating sliding blocks 27 and 28 which are slidable in the directions marked out by double arrows. The device 6' is located at the lower end of the vertically hanging spokes which are designated 11' and 11" in FIG. 3 in such manner that when the sliding blocks 27 and 28 are located in their left and right end positions, respectively, the free lower ends of spokes 11' and 11" will be positioned somewhere along individual V-shaped guide surfaces 29 and 30 of the respective sliding blocks 28 and 27 when the spokes hang vertically downwards. When sliding block 28 is displaced towards the left, one end 31 of a metal wire which is wound around a pin 32 and which continues with a straight end 33 will be actuated by a stationary shoulder 34, with the end 33 being made to engage spoke 11' and to guide the latter in towards the center of the angular recess in guide surface 29. In consequence of sliding block 27 simultaneously being displaced to the right a wire 36 which is secured to a shoulder 35 and which is bent angularly at its free end will guide spoke 11' to the vertex of the angular recess or the V-shaped guide surface 29 and will clamp the spoke there. The same procedure occurs with regard to spoke 11", and hence, if the sliding blocks 28 and 27 and the guide surfaces 29 and 30 are disposed in appropriate manner, each of the spokes 11' and 11" will become clamped in position over an individual aperture in the wheel rim. The sliding blocks 27 and 28 may appropriately be driven by driving means comprising a motor, a slip coupling, a rack and a pinion.

The means or device 6A", 6B" for threading nipples on the spokes is illustrated in FIG. 4. In this device the sliding blocks 27 and 28 of FIG. 3 are utilized, said blocks being displaceable below the wheel rim 39 in the directions shown by the double arrows of FIG. 4. Nipple feeders 40 and 41, respectively, are located each above a respective one of said sliding blocks 27 and 28. When the sliding blocks are set to their outermost end positions the center lines of the nipple feeders 40 and 41 coincide each with the center line of a sheath 48 and a tool 49 which are included in a nipple threading device associated with each one of the sliding blocks 27 and 28, respectively. The nipple threading device comprises a motor 42, a slip coupling 43, a power transmission wheel 44 and a gear 45 which make a flexible spiral wire 46 rotate in a flexible sheath 47 which at one end is secured to sheath 48 which is secured in sliding block 27. The spiral wire 46 is at one end provided with the tool 49 which ends with a resilient pin 50. When sliding block 27 is disposed in its left position the pin 50, the tool 49, and the sheath 48 are located opposite to nipple feeder 40. Every time sliding block 27 is disposed in this end position a nipple is fed downwardly, said nipple falling down into sheath 48 and being intercepted by pin 50. When the sliding blocks 27 and 28 thereafter are displaced towards each other the center line of sheath 48 and tool 49 will in the other hand end position be disposed opposite to the lower end of a spoke which has been secured in position in manner described above. Spiral wire 46 is now fed upwards by means of a feeder 51 and is rotated simultaneously, and the nipple is driven upwardly through an aperture 52 in the rim opposite to the nipple and spoke and engages the spoke so as to be threaded thereon so that the spoke and rim become attached to each other. The same procedure as the one which now has been described is performed on the side of sliding block 28.

In order to enable the wheel rim to be set into such position that hub apertures and spoke apertures mate with each other when a spoke initially is introduced into the hub aperture and thereafter is to be clamped in position over a rim aperture pending a nipple being threaded on, the rim must be given the correct initial position and must be indexed in correct manner. The correct initial position can be achieved by means of pins being introduced into apertures in the rim. Each time a pair of spokes has been mounted the rim is indexed in the manner shown in FIGS. 5 and 6. The hub 7 is indexed by means of a mounted spoke. In FIG. 5 the designation 52 refers to the rim, and the designation 11 refers to a spoke. The rim support rollers 2 and 3 correspond to the ones of FIG. 1. FIG. 6 shows a view of roller 2 taken at right angles to the view of FIG. 5 but on a larger scale and with associated driving means, viz. motor 53, slip coupling 54, gear 55, and a clutch 56 located in roller 2. In this case, too, the designation 52 refers to the rim. Indexing the rim is carried out by a terminal stopping pin 57 in a spoke aperture in rim 52 (FIG. 5) located in the plane of the drawing being made to disengage the rim simultaneously with a prestopping pin 58 for a spoke 11 in the wheel at right angles to the plane of the drawing being advanced to blocking position. Motor 53 drives indexing roller 2 over slip coupling 54 and gear 55 as well as coupling 56 in the direction of the arrow 59 so that the rim 52 is displaced as illustrated by the arrow 60. This continues until a spoke strikes prestopping pin 58 and stops there. At the time coupling 54 begins to slip. The drive of roller 2 is disconnected, and coupling 56 releases roller 2 of all actuation by the drive. Finally the terminal stopping pin 57 is moved upwardly and into a spoke aperture in the rim so as to carry out final adjustment and locking thereof, and thus the indexing has been completed.

The device disclosed by the invention operates in the following manner.

A wheel rim is rolled in from a station with a line of rims on the right hand side of the device of FIG. 1 and is positioned in the center of the right hand station A of the device. Centering is carried out by means of rollers 1A, 2A, and 3A in consequence of roller 1A being displaceable in the directions of the double arrow. Furthermore, a hub is advanced from a station with a line of hubs behind and above the device and is placed in the hub clamp 4, with any existing hub arm being placed in correct position and the shaft of said hub being secured and clamped.

Two spokes are thereafter advanced from two sorting devices each to a spoke advancing tube 9 and down into the latter and are conveyed each through an aperture in the respective hub flanges in manner disclosed above. Every time the tube 9 reaches its rearmost position a new spoke falls down into tube 9.

Two nipples supplied by a nipple sorting device are advanced to and down into the two nipple feeding tools 49. Every time the sliding blocks 27, 28 reach their outer end positions new nipples fall down and are guided up by the tools 49 and the pins 50 (FIG. 4).

A complete cycle in each half or station of the device comprises a starting cycle, seven subcycles and a terminating cycle (in the case when 18 spokes are to be mounted in a spoke inner layer and a spoke outer layer, respectively). The two cycles of stations A and B may to advantage be carried out simultaneously.

During the starting cycle the hubs are clamped against rotation by means of their two pairs of clamping members 4A, 4B, and furthermore the spokes are advanced as illustrated by FIG. 2, with the spokes being supplied to their respective apertures in the hub flange, in which they hang vertically downwards. The two pairs of hub clamps 4A, 4B of FIG. 1 release. The hubs are thereafter rotated 1/9 of a complete revolution by a turning member (not shown), whereafter the hubs are again clamped by the hub clamps 4A, 4B. The sliding blocks 27, 28 of FIGS. 3 and 4 are advanced and clamp the spoke ends, whereafter the means for threading nipples illustrated in FIG. 4 operate in the manner described above, whereupon the sliding blocks return. Simultaneously therewith double pairs of spokes are advanced into their respective apertures of the hub flanges in accordance with FIG. 2.

In each of the seven subcycles the following occurs. The hub clamps 4A, 4B are released. The rim is indexed in accordance with FIGS. 5 and 6. The hub clamps 4A, 4B secure the hub. The sliding blocks of FIG. 3 secure the previously introduced spokes, nipples are threaded on, and thereafter the sliding blocks are returned. Double pairs of spokes are simultaneously advanced into their respective apertures in the hub flange in accordance with FIG. 2.

In the terminating cycle the procedure is the same as in each of the seven subcycles but without new spokes being supplied.

After a cycle as described above has been carried out the right hand station A of the device will have a mounted inner layer of spokes, whereas the left hand station B of the device will contain a complete wheel which is made to roll away to the left. Thereafter the wheel of the right hand station is moved to the left hand station of the device simultaneously with a new rim and a new hub being supplied to the right hand station.

The invention is not limited to the embodiment described above and illustrated in the drawings, and said embodiment merely comprises an example of the invention and its mode of application.

I claim:

1. A method of mounting spokes on and completing a spoke wheel for a bicycle, said method comprising the steps of:
   (a) positioning a hub of a bicycle wheel with its axle shaft ends extending horizontal and its flanges extending vertical, spoke apertures being formed in the flanges in predetermined rotational positions such that if two individual spokes are introduced into each of the lower most apertures of one of said flanges with the spoke head adjacent the respective flange containing the aperture, the spokes hang downwardly in substantially a vertical position under the force of gravity,
   (b) positioning a bicycle wheel rim in a vertical plane with said hub located in the radial center of said rim and with two spoke apertures of said rim located at substantially the lower most part of the wheel in said vertical plane,
   (c) automatically introducing two individual spokes from the outside of said hub into each of the lower most apertures of said hub flanges to the extent that a head of the spoke is adjacent the respective hub flange whereby said spokes hang in a substantially vertical position with their free ends extending toward the lower most apertures of the wheel rim,
   (d) automatically securing each of said two spokes over an individual one of said lower most apertures of the wheel rim,
   (e) automatically introducing spoke nipples, said nipples being introduced from the outside of the wheel rim through each one of said two lower most apertures of the wheel rim for making engagements with individually associated ends of said spokes and for automatically threading said spoke nipples onto said spokes,
   (f) simultaneously indexing by a uniform angular displacement both the hub and wheel rim to skip one pair of apertures in the hub flanges and wheel rim, respectively,
   (g) automatically repeating the above stated steps (a)–(f) until all spokes of an inner layer have been mounted, and
   (h) repeating the entire procedure with regard to all spokes of an outer layer by automatically introducing two individual spokes into each of the lower most apertures of one of the hub flanges, said spokes being introduced from the inside of the respective flange to form a completed wheel.

2. The method in accordance with claim 1, wherein said indexing of the hub and wheel is by 1/9 of a revolution if a wheel has 36 spokes.

3. A device for mounting spokes in and completing a spoke wheel for a bicycle, said device comprising:
   supporting base means;
   means supported by said base means for clamping a bicycle hub in a predetermined rotational position with its axle shaft extending horizontally and its flanges extending vertically,
   means supported by said base means for supporting a bicycle wheel rim in a vertical plane with the hub positioned near the radial center of said rim,
   means supported by said base means for automatically advancing spokes through individually associated apertures of a flange on said bicycle hub, said advances being made from the outside and from the inside of said flange, respectively,
   means supported by said base means for automatically securing spoke ends in said hub for defining the positions of said spoke ends,
   means supported by said base means for automatically introducing spoke nipples from the outside of said rim through apertures formed in said rim and for threading said spoke nipples onto the ends of individually associated ones of said spokes, and
   means supported by said base means for automatically indexing said wheel rim and hub to enable an insertion of the next spokes after the completed insertion of a previous spoke and attachment thereof to the rim.

4. A device in accordance with claim 3, wherein said means supported by said base means for automatically advancing said spokes comprise an elongated tube having a longitudinal recess with side edges forming a guide for a spoke, means supported by said base means for displacing said tubes in the longitudinal direction thereof, and means supported by said base means for displacing a spoke disposed in the elongated tube in its longitudinal direction.

5. A device in accordance with claim 3, wherein said means supported by said base means for automatically securing the spoke ends comprise two mutually similar and cooperating sliding blocks supported by said base means having V-shaped guide surfaces, a member supported by said base means adapted to engage a spoke for introducing said engaged spoke into the V-shaped recess of the sliding block, and a member supported by said base means for retaining the engaged spoke in said V-shaped recess.

6. A device in accordance with claim 3, wherein said means supported by said base means for automatically introducing said spoke nipples and for threading said spoke nipples comprise a tool supported by said base means which is adjustable between a position for receiving spoke nipples from a supply device and a position for threading nipples onto said spoke ends.

7. A device in accordance with claim 3, wherein said means supported by said base means for automatically indexing said wheel rim and hub comprise a first member supported by said base means for engaging a spoke of an indexed rim which indexes the hub, a second member supported by said base means for engaging an aperture in the wheel rim, and an indexing member supported by said base means.

* * * * *